United States Patent [19]

Kruszona

[11] 4,295,439
[45] Oct. 20, 1981

[54] HAND OPERATED APPARATUS FOR APPLYING A GASKETING COMPOSITION

[75] Inventor: Edward G. Kruszona, Schenectady, N.Y.

[73] Assignee: General Electric Company, Waterford, N.Y.

[21] Appl. No.: 78,754

[22] Filed: Sep. 25, 1979

[51] Int. Cl.³ ............................................. B05B 13/04
[52] U.S. Cl. .................................... 118/317; 33/23 C; 118/323
[58] Field of Search ............... 118/323, 407, 408, 410, 118/317, 318, 300; 33/23 H, 24 C, 24 R, 27 K; 83/565

[56] References Cited

U.S. PATENT DOCUMENTS

| | | | |
|---|---|---|---|
| 676,813 | 6/1901 | Du Brul | 83/565 |
| 1,396,993 | 11/1921 | Carter | 33/24 C X |
| 3,044,894 | 7/1962 | Makowski et al. | 118/323 X |
| 3,324,625 | 6/1967 | Dulmage | 118/323 X |
| 3,387,375 | 6/1968 | Nowotny | 33/23 H |
| 3,417,979 | 12/1968 | Cable et al. | 83/565 X |
| 3,426,710 | 2/1969 | Cash | 83/565 |
| 3,537,345 | 11/1970 | Luppino | 83/565 X |
| 3,958,472 | 5/1976 | Kabanov et al. | 83/565 X |
| 4,015,560 | 5/1977 | Paul | 118/323 |

FOREIGN PATENT DOCUMENTS 1178401  1/1970  United Kingdom ............... 118/323

Primary Examiner—Morris Kaplan
Attorney, Agent, or Firm—Michael J. Doyle; John L. Young; Philip L. Schlamp

[57] ABSTRACT

A hand-operated apparatus for applying a gasketing composition on a part comprising the improvement where there are template means, with a track means beneath the base on which the part is located in which in the track means there moves a roller means which is connected to a movable arm means to which said movable means there is also connected dispensing mean for dispensing the gasketing composition. With such means, the amount of composition that is applied to the part to form a gasket as well as the path of the travel of the dispensing means as well as the height of the dispensing means from the part so as to determine the thickness of the gasket is fixed by the machine, the operator only guiding the starting, the stopping, and the dispensing of the composition.

12 Claims, 9 Drawing Figures

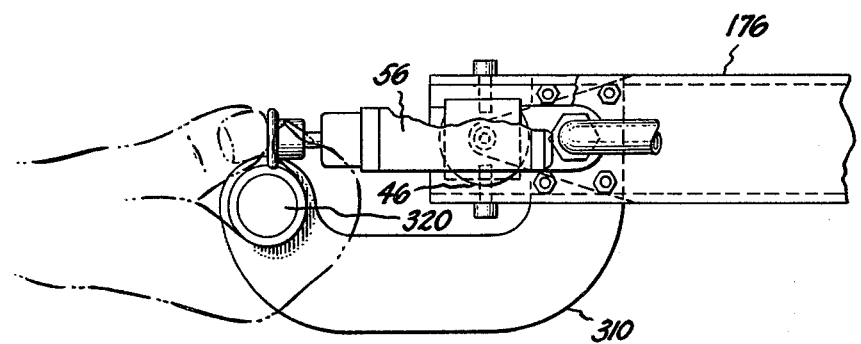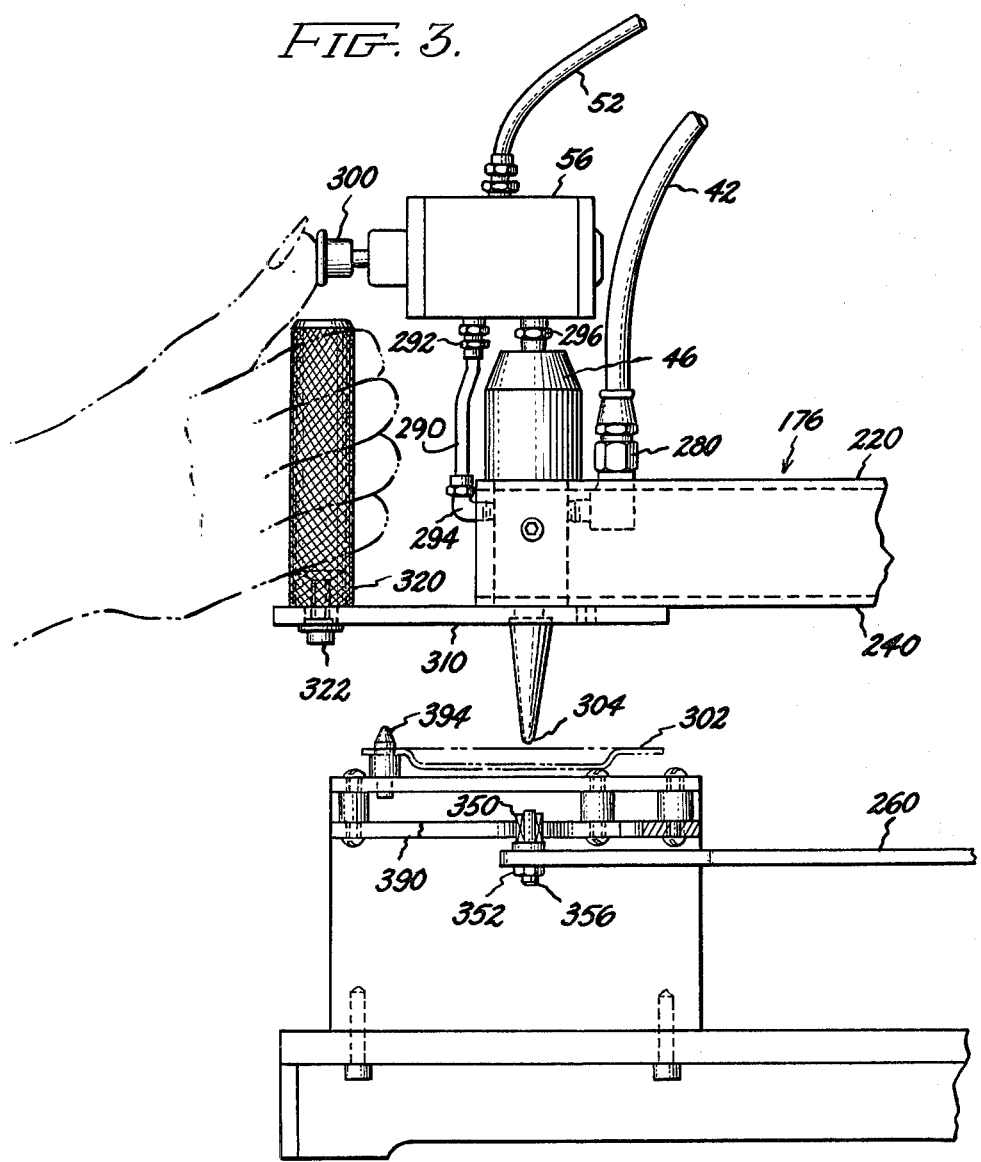

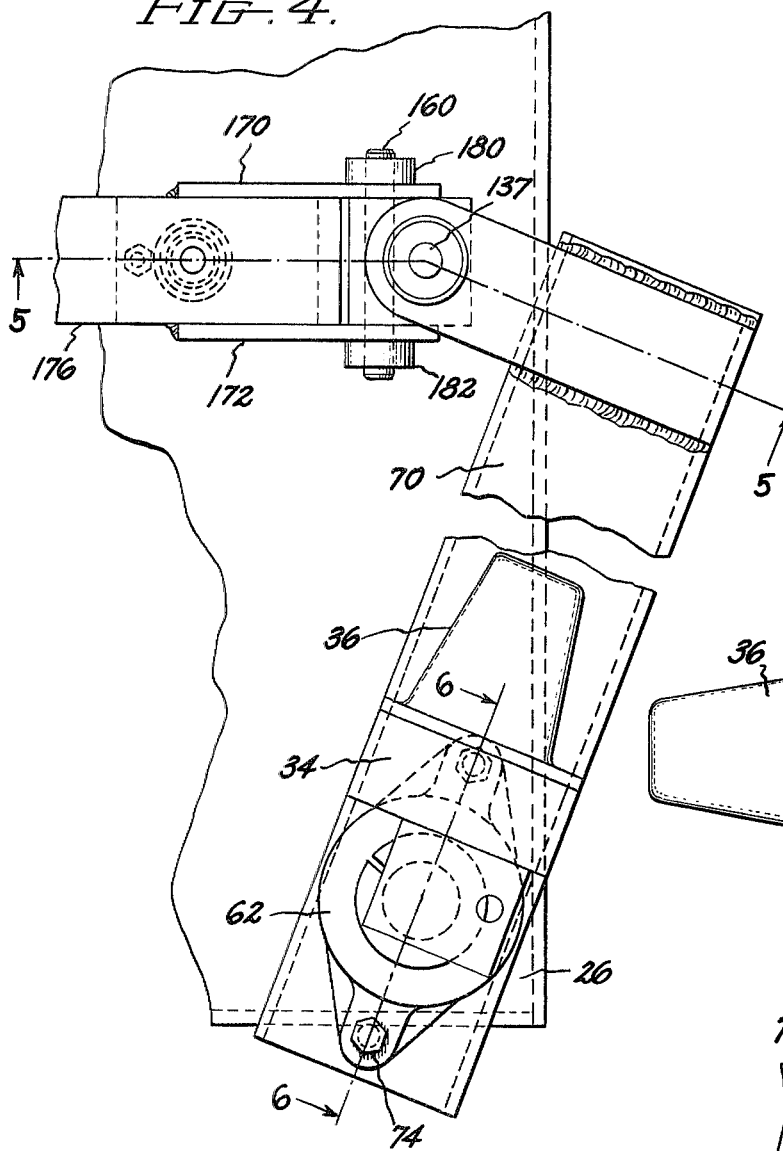
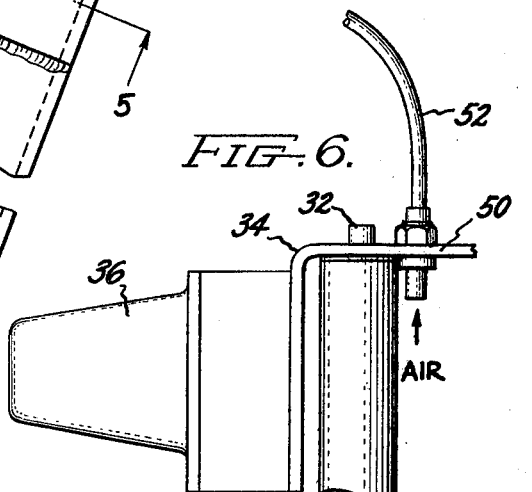
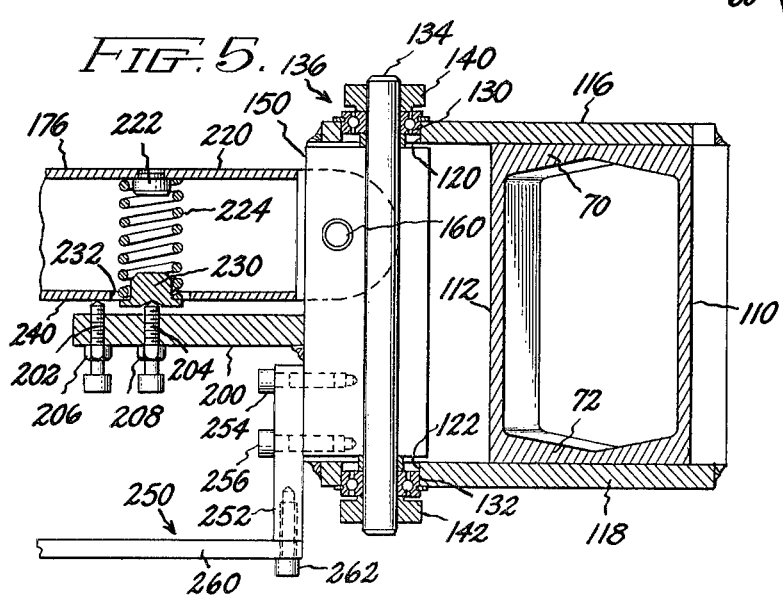
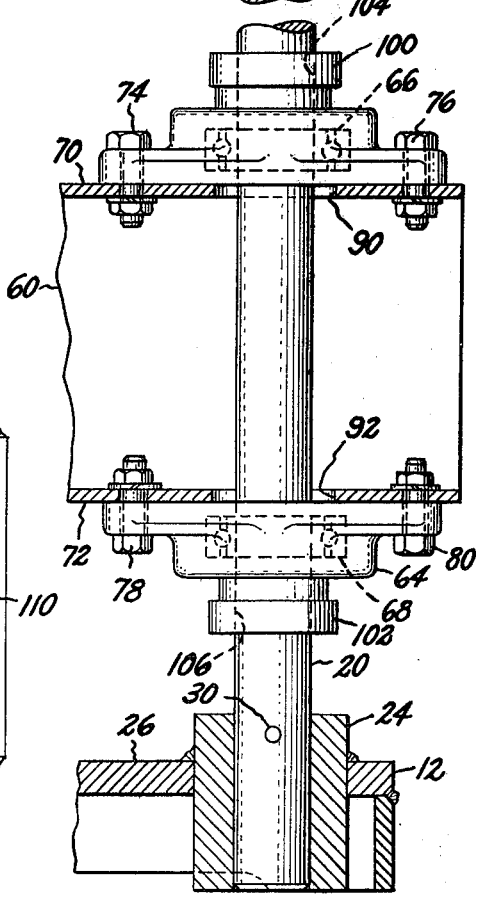

HAND OPERATED APPARATUS FOR APPLYING A GASKETING COMPOSITION

BACKGROUND OF THE INVENTION

The present invention relates to machine for dispensing a gasketing composition and more particularly the present invention relates to a machine for semi-automatically dispensing a gasketing composition wherein the height of the dispensing means from the part to which the gasketing composition is applied, the traverse speed of travel of the dispensing nozzle means as well the amount of material applied to the part.

Silicone compositions are well known. One type of silicone composition is a room-temperature vulcanizable silicone rubber composition and more particularly a one component group temperature vulcanizable silicone rubber composition. Generally, such one component room temperature vulcanizable silicone rubber (hereinafter referred to RTV) compositions comprises as the basic ingredients, a silanol end-stopped diorganopolysiloxane polymer having a viscosity varying anywhere from 500 to 500,000 centipoise at 25° C. where the organic groups are any monovalent hydracarbon radical but more preferably methyl and phenyl. In the most prevalent of such systems, the crosslinking agent is methyltriacetoxy silane. Although there are various other types of systems which are well-known and generally comprised as a cross-linking agent and an alkoxy silane an amide functional silane, an aminoxy functional silane, and other types of functionalities for the silane cross-linking agent. Usually, such as silane cross-linking is used in the concentration of 1 to 15 parts per 100 parts of the base silanol end-stopped diorganopolysiloxane polymer. In addition, there is present from 0.01 to 5 parts by weight per 100 parts of the base polymer of a catalyst which with the acetoxy silane cross-linking agent is metal salt of a carboxylic acid. The most preferred catalyst are tin salts of carboxylic acids such as dibutyl tin dilaurate. Such composition with the base silanol polymer, the cross-linking agent and the tin salt are prepared and mixed in a substantially anhydrous state and the composition is packaged in a single package. Such a composition is therefore known as one-part RTV composition. When it is desired to cure the composition the seal on the package is broken and the composition is applied and simultaneously exposed to atmospheric moisture. Under those conditions, the composition will form a skin in as rapidly as 10 to 20 minutes and fully cure to a silicone elastomer in 24 hours.

There may be added other ingredients to the basic composition. One of these basic ingredients being from 4 to 400 parts of filler per 100 parts of the base polymer. The filler is desirably selected from reinforcing fillers such as fumed silica or precipitated silica which may be treated with such ingredients as cyclo polysiloxanes, along or in combination with silazenes. The advantage of treating the filler, specifically the reinforcing filler is to prevent a rapid viscosity build up in the composition in the uncure state while imparting the appropriately desired reinforcing properties to the composition. It is undesirable to add so much filler in the composition such that the composition has a viscosity build-up in the uncure state such that it is difficult to dispense from a tube, such as a caulking tube. Accordingly, it is highly desirable to treat the filler. Of course, there may be also added extending fillers to the composition, alone or in combination with the reinforcing fillers such as diatomaceous earth, lithopone, zinc oxide, iron oxide, groud quartz, and so forth. There may be added out the other ingredients to the composition such as a triorgano end-stopped, diorganopolysiloxane, plastisizers, and other well known ingredients. Such addition of other ingredients to the basic composition form the basis of a great host of patents in the silicone field.

Irrespective of the above, it has been found that such silicone one-component RTV compositions are especially suitable as gasketing compositions or compositions for the formation of formed-in placed gaskets in automobiles. The reasons for the desirability of silicones as formed-in place gasketing material in automobiles is primarily due to their resistance to oil swell and also to their high temperature stability. Further, silicone have suitable weatherability characteristics. It should be noted that there are specific silicone compositions, one-component systems, that are improvements over the above basic composition that was discussed previously and can be formulated so that such compositions have further inhanced resistance to oil swell or even more inhance high temperature stability. The practice in the industry in the application of silicone and specifically one-component composition to form in place gaskets in automotive components has been dramatically diversed. On the one hand, there has been developed a great highly complicated computerized piece of machinery for automatically forming gaskets on automotive parts. Accordingly, such a computerized machinery normally operates by procedure by which the work piece is placed on the holding fixture and then anti-tie down buttons when pressed initiate the lowering of the nozzle to the work piece. Silicone material flows from the nozzle and transfer motion begins simultaneously automatically. The bead of silicone is dispensed in a uniform bead onto the work piece in a predetermined gasket pattern programed by either following a back line pattern via photo trace scrvodrive or multiple cams which drive the nozzle through the XY coordinates of the gasket pattern. At the precise moment that the gasket pattern is complete, the dispensing of the material is abruptly terminated and the nozzle is raised above the work piece. The work piece is then unloaded from the fixture and either assemblied to the mating part or set aside to cure. All the functions of such a piece of machinery are precisely timed and controlled by time-delay relays and interrelated magnetic relays which in turn controls pneumatic cylinders, electric motor drives, gear boxes to perform each vital function automatically and with precision. However, such machineries are highly complexed and normally require investment of $30,000 to $100,000 per machine depending on the functions or the variety of parts it is desired to be able to service with such a machine. Accordingly, not every business which fabricates assemblies which necessitates the presence of gaskets, is capable of investing in such a machine especially where the gasketing portion is a minor aspect of the total operation of the fabrication of the part. Accordingly, in small operations, it has been the custom to have an operator apply or form the placed gasket in a total manual manner from a tube. Accordingly, such a procedure involves the operator taking a tube of silicone and squeezing it on to a part and making a determination as to height of the tube from the part that is the thickness of the bead of silicone, the travel of the tube so as to form the path of silicone on the part and also the rate at which the silicone is dispensed on the part; all such functions in the application of the silicone bead being performed manually.

While such a method does not involve the large capital investment of the previous complex piece of machinery, nevertheless, it is a haphazard method and results in many poorly fabricated gaskets and a large rejection of poorly fabricated gasketed parts. Accordingly, it was highly desirable to have a relatively inexpensive piece of machinery which could be operated by an operator to put down or place a bead of gasketing silicone material on a automotive part wit precision and reliability from application to application and which could be utilized by an operator with facility and reliability.

Accordingly, it is one object of the present invention to provide for an inexpensive apparatus or machine which would apply uncured gasketing compositions to a part with facility and reliability.

It is another object of the present invention to provide for an inexpensive apparatus or machine which could be manually operated by an operator by which would automatically determine the thickness of the bead of the silicone material on the part and which would automatically determine the path of travel of the silicone on the part and which would automatically determine the amount of silicone that was applied as the bead on the part.

It is yet an additional object of the present invention to provide for an inexpensive apparatus for dispensing an uncured silicone gasketing composition to an assembly part which dispensing is carried out semi-automatically and efficiently, and in which the application of the silicone gasketing material is reproduceable from part to part.

It is still yet another object of the present invention to provide for an inexpensive apparatus for applying an uncured silicone gasketing composition to an automotive part which is done in a semi-automatic manner in which the application of the silicone bead is reproducable from part to part.

It is a further object of the present invention to provide for an inexpensive apparatus for applying a one component RTV silicone system as a gasketing composition to automotive parts in which the application of the one component RTV silicone system is semi-automatic.

These and other objects of the present invention are accomplished by means of the disclosure set forth here and below.

SUMMARY OF THE INVENTION

According to the above objects, there is provided by the present invention a hand-operated machine or apparatus for applying a gasketing composition which is preferably a one-component RTV composition on a part which is preferably any part comprising of a frame; of base on said frame on which is placed said part on which said gasketing composition is to be applied; template means with a track means located beneath said base; movable arms means connected to said frame and having roller means which is mounted to travel in said track means and dispensing means capable of dispensing gasketing composition mounted on some movable arms means such as to travel in fixed relationship to said roller means; and trigger means located in said dispensing means for activating said dispensing means. As stated previously, preferably the composition is a one component room temperature vulcanizable silicone rubber composition. Prior to which this bead of silicone is applied to form the fabricated placed gasket in an automotive part. The dispensing means general comprises a poppet air activated valve which is activated by a four-way air valve source to dispense silicone composition by the pressing of a button on the dispensing means by the operator.

In dispensing the composition, the operator simply holds the apparatus by a handle which is further included on the apparatus and by merely then pressing on a button to activate the dispensing and then by pushing the dispensing mean through the said path in the template means that is determine by the roller means passing through the track means of the template means such that the bead of silicone is always applied in the fixed path as determined by the travel of the roller in the template means. If it is desired to apply a gasketing bead to a different type of part then simply there is affixed to the apparatus the template that has been prepared for that particular part and as long as that particular type of part is utilized to form a bead thereon the apparatus with the roller means traveling in that particular template means the apparatus will always apply a fixed path of silicone sealant to the automotive parts or to the other type of parts in a semi-automatic manner.

It should be noted that the machine determines how far dispensing nozzle is from the part and accordingly determines the thickness of the bead of the silicone. It also determines automatically the path of the silicone dispensing means over the part and it determines to a certain extent how much silicone is applied to the part in the silicone bead. The invention is more fully explained by the drawings set that are enclosed. It should be noted that traverse speed determines size of bead or volume of material with a fixed flow rate as set by material pressure regulator, i.e. a slower traverse speed would dispense a larger bead and a faster traverse speed by the operator would dispense a smaller diameter bead or the volume of flow of material can be changed by adjusting the material pressure regulator.

FIG. 2 is a top view of the dispensing means of the invention of the instant case.

FIG. 3 is the side view of the dispensing means and the template means of the apparatus of the instant case.

FIG. 4 is the top view of the preferred movable arm means of the instant case.

FIG. 5 is a view along lines 5—5 of FIG. 4.

FIG. 6 is a view along lines 6—6 of FIG. 4.

DESCRIPTION OF THE PREFERRED EMBODIMENT

Before going into an explanation of the apparatus of the figures, it is necessary to discuss to some extent what the composition can be utilized with the instant apparatus. As stated previously, the instant apparatus was produced for the use of a one component or 1-part of RTV silicone compositions of the type described previously. By utilizing a suitable metering device at the dispensing means, a two component system can also be applied with the apparatus in the instant case. However, the instant apparatus can also be applied to produce formed in place gaskets with other compositions other than a silicone composition where the system is preferably a one component system which is cured upon exposure to the atmosphere. An example of other compositions that can be utilized in addition to one component RTV silicone compositions are as follows: anerobics and such sold as Loc-tile and Formagasket as well as others.

Figure 1:
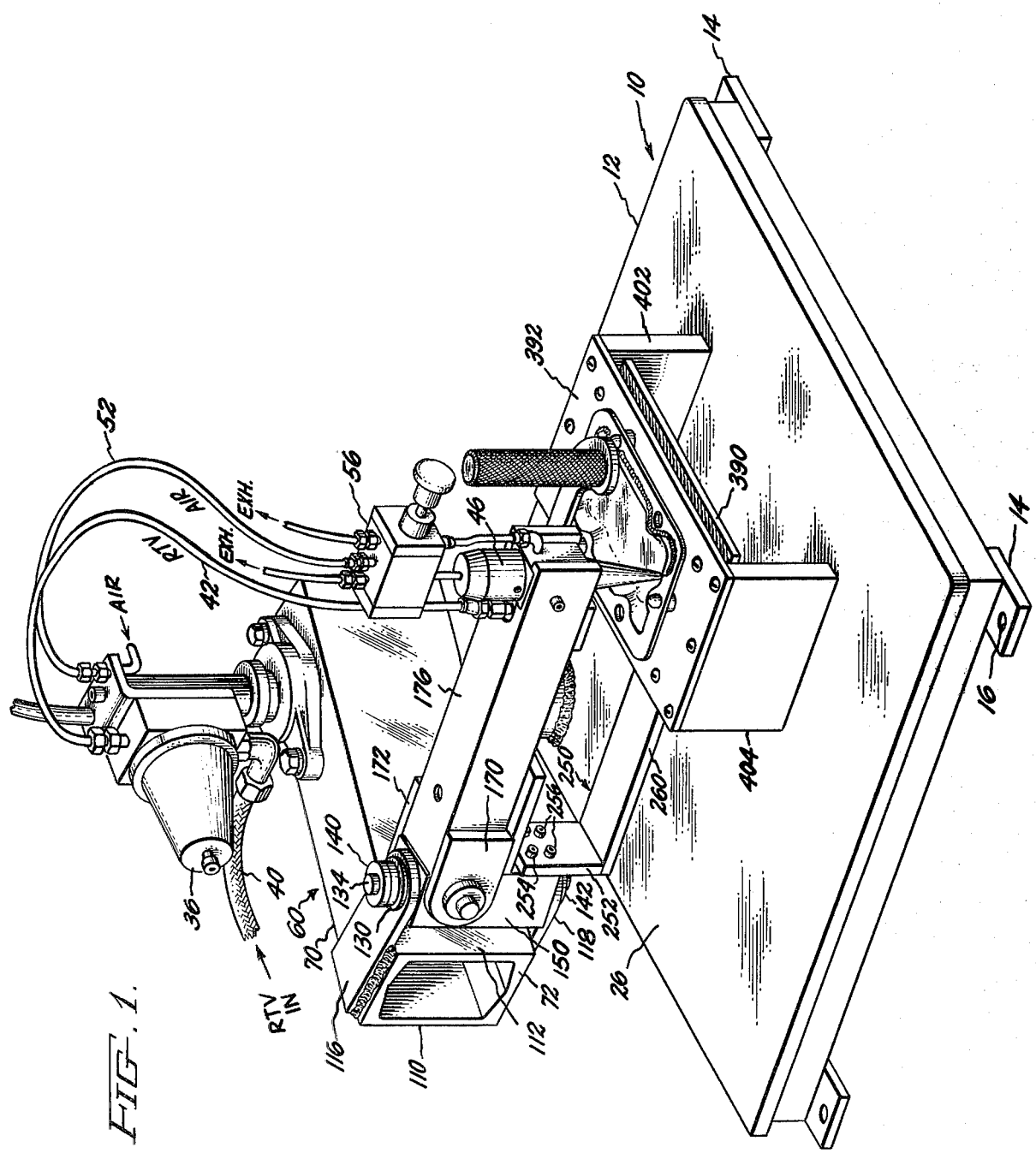
FIG. 1 is a prospective view of the apparatus of the instant case.

Referring to the Figures and specifically the prospective view of FIG. 1 the apparatus desirably comprises of platform (10) having a base platform 12 and flanges 14 at the bottom of the flat base platform 12 which flanges are preferably present for each corner of the base platform said flanges (14) which are internally connected to the flat base having holes (16) for the receiving of bolts (not shown) such that the platform can be located or positioned firmly on any support surface as is shown in FIG. 1. Preferably the base platform has flanges (14) on each corner of the four corners of the platform however, it can have more or less. Most preferably it will have 4 which if the platform is of rectangular design. According to FIG. 6 post (20) is located or supported in opening 22 having boss (24) being connected to surface (26) of base platform (12). Post 20 is immovably and firmly connected to boss 24 through pin 30. Post (20) has protusion (32) over which slides bracket (34) through an opening in bracket 34 not shown to which is attached silicone material pressure material regulator (36). Pressure regulator (36) regulates the pressure of the one component RTV silicone system that is passed to the other parts of the apparatus and is a part well known in the art. Pressure regulator (36) does not form any part of the instant invention and will not be described in detail. Looking at FIG. 1, it is sufficient to state that the RTV is passed to line (40) into pressure regulator (36) and it is then passed from pressure regulator (36) through a line (42) into dispensing means (46). Going back to FIG. 6 bracket 34 has opening 50 through for supporting air line 52 which passes into four-way air valve (56).

In base platform (12) which forms the base of a frame of the apparatus of the instant case appended to post 20 there is an upper arm 60. There is attached to post (20) through pillow blocks 62 and 64 which have bearings 66 and 68 which bearing 66 and 68 are adjacent to the post (12). Pillow blocks 62 and 64 are attached to the upper surface 70 and lower surface 72 respectively of upper arm by bolts 74, 76, 78 and 80 with the correspondingly nuts which are not numbered but are shown in the drawing for appending the pillow blocks 62 and 64 to the upper surface 70 and the lower surface 72 of upper arm 60. Post 20 passes through openings 90 and 92 of upper surface 70 and lower surface 72 respectively of upper arm 60. Upper surface 70 and lower surface 72 forming the upper and lower sides of a 4-sided upper arm 60 rectangular in cross-section which is hollow and which is supported on post 20 which passes through openings 90 and 92 by pillow blocks 62 and 64. Upper arm 60 is allowed to rotate above about 20 through bearings 66 and 68 and pillow blocks 62 and 64 respectively. Upper arm 60 is prevented from sliding up and down on post (20) by clamp collars (100) and (102) which support collars (100) and (102) have openings (104) and (106) respectively through which post (20) passes. The collars are held in place by support collars 100 and 102 have a vertically passing slots through which passes a threaded screw which by threading the screw the support collar (100) and (102) can be securely fastened so that it is immovable on post (20). While the slit had been shown the threaded screw which is located in support collars 100 and 102 have not shown since such is well known in the art. Upper arm (60) has upper sides 70 and lower sides 72 and vertical sides 110 and 112, the arm being in the form of a rectangle cross-section and hollow.

As can be appricated upper arm 60 can have any configuration just as long as it is capable of swinging movement in the horizontal plane about post 20 also the means and methods of attaching the arm to post 20 allow it to swing thereby can be of any type and means, the above means being shown as exemplary only. To sides 70 and 72 of upper arm 60 there are placed flanges 116 and 118 as seen in FIG. 5 which are preferably welded or formed in place with sides 70 and 72 through which there are openings 120 and 122 in which openings are mounted bearings 130 and 132 through which passes pin 134 of joint 136 so that joint 136 can rotate in a horizontal plane as indicated in the drawing. Pin 134 is kept in place by clamp collars 140 and 142 by means well known in the art. The elbow on joint 136 comprises a tubular body 150 through which has an upper end and a lower end and in which there is located flanges 116 and 118 which have opening 120 and 122 therein and in which there are bearings 130 and 132 so that joint 136 can swing in a horizontal plane with respect to upper arm 60 and flanges 116 and 118.

The particular structure of the bearings and clamp collars is well known in the art. Through the tubular body 150 of joint 136 there passes a joint 160 to which is attached flanges 170 and 172 which are fixedly attached to forearm 176 and arm 176 can be hollow with four sides, having a rectangular cross-section. Flanges 170 and 172 which are seen in better prospective in FIG. 4 and can be fixedly mounted to the sides of forearm 176 in any manner. Flanges 170 to 172 have openings therein, through passes pin 160 and said pin retained and positioned by nuts 180 and 182, pin 160 are being threaded on both ends. Accordingly with such an arrangement of the location of pin 160 upper forearm 176 can be raised in a verticle plane with respect to joint 136. It should be noted that while not shown, it is preferably desired that the flange sides 170 and 172 have bearing surfaces through which pin 160 passes so as to reduce to the minimum the wearing away of the pin or of the holes or the openings in flanges 170, 172. However, this is not strictly necessary since the movement of forearm 176 is in the vertical plane this is the least amount of movement of that particular part with respect to the movement of all the other parts which respect to the operation of the apparatus.

Referring to FIG. 5, it is seen that below forearm 176 there is support number 200 which welding on the fixedly supported tubular body 150 of joint 136. Through support member 200 passes 2 threaded bolts 202 and 204 having stop nuts 206 and 209 thereon. On the upper side 220 of forearm 176 there is plug 222 above which is located compression spring 224. Compression spring 224 passes down and over and against guide plug 230 in opening 232 on lower thru side 240 of forearm 176. By having compression spring 224 pressing down against plug guide 230 the forearm 176 will be pushed upwards when it is not in use. By adjusting the bolt 204 and retaining nut 208 the amount of downward force in an upward direction, and the upward travel of forearm 176 can be adjusted with pressure spring 224 and also the travel of forearm 176 in an upward fashion against upper limit stop 232A. However, the downward travel of the forearm is determined and measured by bolt 202 and retaining nut 206. Retaining nut 206 and 208 are simply turned to lock the two bolts from unscrewing or screwing into the support member 200 by the vibration during the operation of the apparatus. However, by the impinging of side 240 on bolt 202 and by the amount of pentration of the point of bolt 202 above supporting side 200 will determine the amount of downward travel of forearm 176. The adjustment on bolt 204 more or less determines how much the forearm 176 will travel downward by acting as a stop limit in the vertical plane and also accurately determines the distance from the nozzle to the to the workpiece and swing in the vertical plane after it is released from being manually held by the operator of the apparatus as explained herein below. At the bottom of joint of tubular body 150 of joint 136 there is attached a follower support arm 250 as composed of two pieces of vertical arm 252 held on by bolts 254 and 256 and horizontal arm 260 held on to vertical arm 250 by bolt 262.

The distance of horizontal forearm 260 above the base platform 12 can be determined by the positioning of bolts 254 and 256 in arm 252. Accordingly, more height for high workpieces can be provided between the nozzle 304 and the positioning fixture 394 by simply repositioning the entire upper arm and forearm assembly at a higher position on colomn 20, and also relocking clamp collars 100 and 102. Accordingly, horizontal arm 260 vertical position can be maintained in respect to template 390 by changing the top bolts 234 to the lower set of holes in 150. This is an optional modification in the instant invention to facilitate dispensing onto higher workpiece 5. Any other types of means can be utilized. It is only necessary within the scope of the instant invention that follower arms 260 and 252 fixedly supported to each other and be fixedly supported to tubular body 150 of joint 136 to engage template 390.

Proceding now to FIGS. 2 and 3 it is seen that to the forward end of the forearm 176 is appended dispensing means 46 which receives material through line 42 and fitting 280. Dispensing means 46 is really an air cylinder which is operated by air and with a retractable poppet valve such that when it is operated by four-way valve 56 it receives supply air through line 52; the air passing into dispensing means 46 through line fitting 296 and exhausts air through fittings 292, 294 and line 290 in which the air for four-way valve 56 is also connected to dispensing means 46 through fitting 296. The four-way valve has trigger button 300 on it which can be manually pressed down by thumb of the operator to to activate dispensing and which will release the RTV silicone composition onto the top of part 302 through opening 304 of dispensing means 46. Dispensing means 46 which is fixly supported to the forward part of forearm 176 it is motivated by a handle held by the operator, which handle comprises a lower support number 310 fixedly supported to the lower side 240 of forearm 176. To support member 310 there is fixedly positioned a handle 320 by revited bolt 322.

Accordingly by placing this handle 320, and simply moving the handle and pressing trigger 300 the operator can start at the dispensing means 46 to dispensing silicone composition on part 302 and guide the application of the silicone composition onto part 302 both by manually exerting force on dispensing means 46 as well as the pressing of trigger 300 which starts the flow of the silicone. By simply releasing the trigger 300 the operator stops the flow of silicone composition. By letting go of the handle, the compression spring 224 and forearm 176 will force the forearm 176 to spring upward in a vertical plane away from the part, such that the part can be removed from its fixture support.

It was stated that the operator can guide the dispensing means. However, he is limited in the amount of guiding he can do with respect to the dispensing means 46 since the travel of the top or opening 304 of the dispensing 46 is controlled by the template means that will be explained here and below. Accordingly, on horizontal arm 260 as shown in FIG. 3 at the forward end there is a roller 350 below which there is a sleeve 352, a shaft 356, a sleeve 352 being positioned on horizontal arm 260. Roller 350 which is fixedly located on arm 260 moves internally with forearm 176 and dispensing means 46 and is guided in its movement in the template means 390 which is affixed by bolts to platform 392 on which there are support number 394 on which the parts rest.

Figure 7:
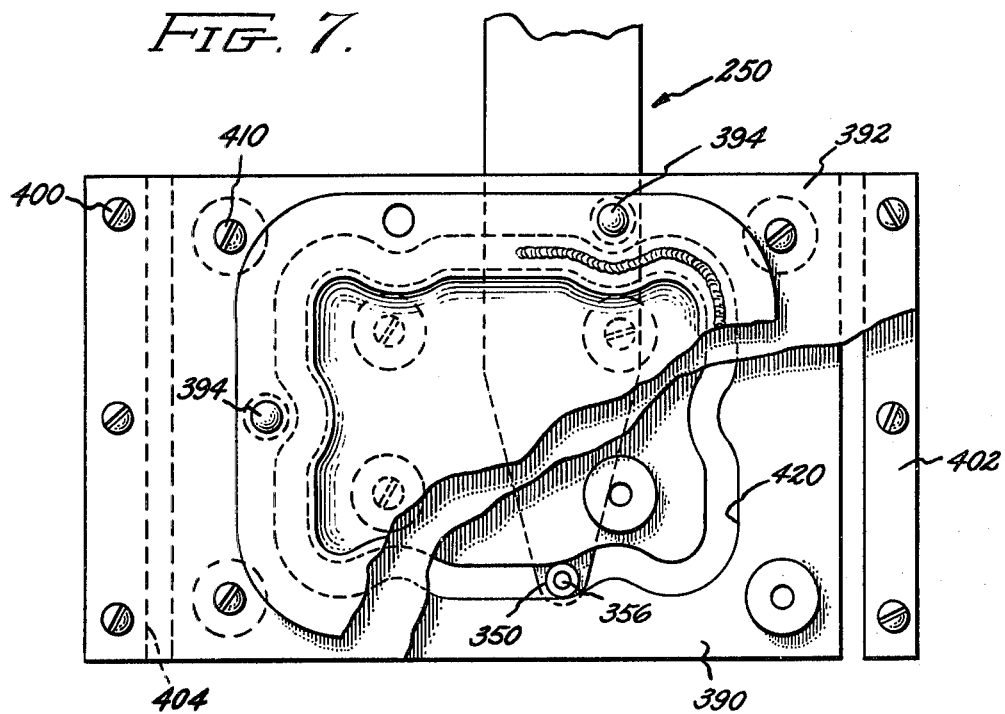
FIG. 7 is a partially cut-away top view of the template means of the instant case.

Referring to FIG. 7 having a more clear view of the template means and of the platform 392 as seen in FIG. 1 screws 400 attach platform 392 onto supports 402 and 404 which are further screwed or fixedly supported on platform 12 as shown on FIG. 1. The supporting of the platform to support numbers 392 to 402, and 404 and onto platform 12 can be done in many ways; the way shown in the drawings being one particular embodiment. Below platform 392 which is supported with respect to the platform by screws 410 there is roller 350 of horizontal follower arm 260 which travels in track 420 in template 390 which is fixedly supported to platform on plate 392. Accordingly, by fixing the travel track 420 of template 390 when the operator moves the handle 320 to move the dispensing means, the dispensing means can only travel in the track 420 which is permitted by roller 350. Accordingly, by the set appropriate track of travel 420 in template 390 the path of dispensing means 46 can be guided so that it will dispense silicone composition on the appropriate path on the surface of part 302 which is fixedly supported on affixed on top of base plate 392 which rests over bolts 394 of base plate 392. Accordingly, as can be well envisioned by a worker skilled in the art, the fixed support 394 on the base plate 392 can be set so that when the part is fixedly attached to base plate 392 by having the part placed over bolts 394 it is fixedly supported thereon and by predetermining the travel of roller 350 in track 420 in template 390 there can be an exact and precise determination of the dispensing of silicone composition from dispensing means 46 onto the surface of part 302. In the drawings shown, there is a 1 to 1 relation between the travel of track 420 and roller 350 and the track of application of silicone composition onto part 302. However, any other relation can also be worked out.

By this means it can be envisioned that a whole series of templates and base plates can be worked out for various types of parts except when it is desired to apply the silicone gasketing composition to a different type of part by simply unscrewing the base plate 392 from the support numbers and then applying a new base plate and a new template means having a new track for the particular type of part to be gasketed, a new part can be used in the machine. Accordingly, the invention of the instant case is not limited to applying the formed in place gasket for silicone composition to a particular type of part by the invention of instant case and can be applied to produce formed in place gaskets by semi-automatic means of all type of parts. Accordingly, the invention of the instant case is applied by semi-automatic means and by the operator manually pushing the dispensing means through a predetermined path as determining by the track in the template silicone compositions for a formed in place gasket of a determined path on the part the only in application being that the operator starts the dispensing of the composition and terminates it and also the speed with which the operator forces the dispensing means along the prescribed path on top of the part on which the gasket is to be formed. The apparatus that is shown in the instant case is preferred with respect to the type of linkage shown for the dispensing means and for the follower arm 250 and the dispensing means 46. Accordingly, the upper arm is joined to the followers arm is the preferred type of linkages for guiding the dispensing means 46 and the follower support arm 250. However, an alternate and not as preferred embodiment is shown in FIG. 8.

Figure 8:
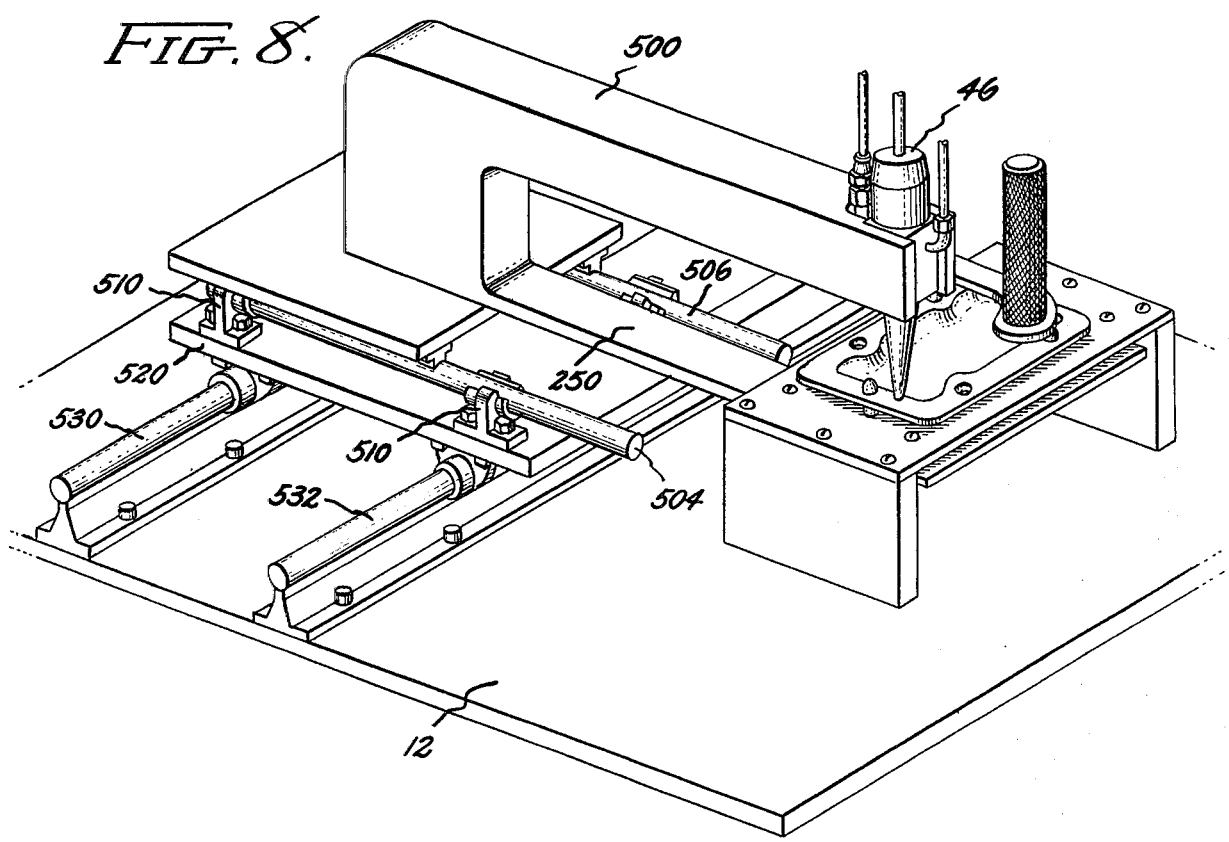
FIG. 8 is another type of movable arm means that may be utilized in the apparatus of the instant case.

The embodiment that is shown in FIG. 8 comprises mounting the upper arm, the joint, and the follower arm on the X Y table. In FIG. 8, the upper arm, the joint and the follower arm are all welded or molded into one component being one fixed arm 500, which fixed arm 500 a dispensing means and follower arm with a roller means as discussed previously with a previous type of linkage is used. In other words, the follower arm and dispensing means can be appended in the same way to fix arm 500. Arm 500 is fixedly supported on platform 502 which slide on slides 504 and 506 which are affixed by supports 510 which are shown in FIG. 8 and supports 510 are fixedly supported to platform 520. Platform 520 slides in a direction perpendicular to the direction of the sliding of platform 502 on slides 530 and 532 which are fixedly supported to platform 12 for instance. Although the X, Y track supporting fixed arm 500 can be utilized in the instant apparatus to guide the movement of dispensing means 46 and follower arm 250. Nevertheless, the linkage as shown previously is preferred since the action on such a linkage is much smoother as noted previously in the invention of this instant case.

Figure 9:
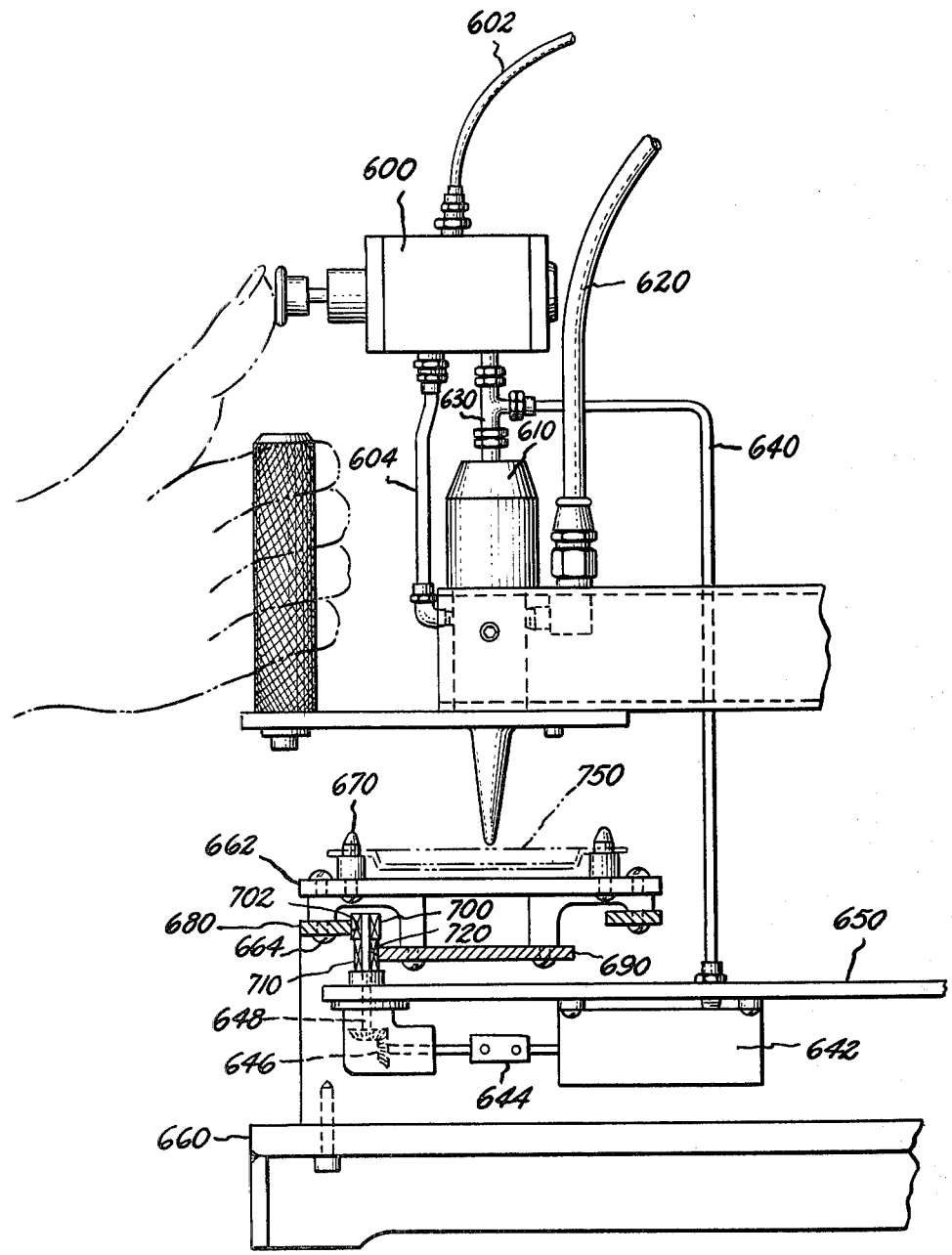
FIG. 9 is an alternate embodiment in which the amount of silicone applied by the dispensing means is automatically determined and in which the rate of travel of the dispensing means over the part is automatic.

Further, in the semi-automatic application of silicone gasketing composition to part of the instant case the operator only determines the start and stop of the dispensing of the composition and also the rate of travel of the dispensing means over the path to which the gasket is to be applied on the part. The apparatus can be further automated by the travel of the dispensing means over the path on which the gasketing composition is to be applied for each application depending on the particular template for a particular part. Accordingly, the means by which this can be accomplished is shown in FIG. 9.

Four-way valve 600 has air passing into it through lines 602 and passes air through line 604 into dispensing means 610 whereupon material is dispensed by means 610 where silicone composition enters dispensing means through line 620. The four-way valve 600 also has line 630 attached to it and to dispensing means 610 for which there is further air line 640 which powers an air motor 642. It should be noted that in the instant invention there has been disclosed air motors and air power in the activation of the dispensing means and also of this alternate embodiment. However, as can be imagined, any type of motor may be utilized such as electric motors to carry out the same function in drive ratio of such motors can be fixed so that they will activate the dispensing means uniformly to dispense a uniform amount of silicone composition at all times and so that the motor will be powered at a uniform rate. Motor 642 through a linkage power gears linkage 644 which powers beveled gears 646 to power shaft 648. Shaft 648 is supported by follower arm 650. On platform 660 as previously discussed there is supported base plate 662 which is connected by bolts 664 as was discussed with the previous template and base plate embodiment. There are protusions 670 for the placing of the part thereon. However, the tract of the template is changed in this embodiment such that there is an upper template section 680 and a lower template section 690. An upper knurled roller 700 [see FIG. 9] which is powered by shaft 648 travels on surface 702 while knurled follower bearing 710 [see FIG. 9] merely rolls on surface 720 of lower template 690. This configuration of an upper roller and of an upper template 680 and a lower 690 template is designed so that if the upper or lower roller fails to touch the surface of the corresponding template on which it is set up to roll on, the other roller will keep the follower arm 650 moving at the appropriate speed without changing direction of the movement of the follower arm 650. It should be noted that if the template was designed as the previous one that is with the upper template 680 at the same horizontal plane as lower template 690 then if the roller lost contact with the outer surface and touched the inner surface of the template edge the follower arm would reverse directions. Accordingly to prevent this, there has been designed the template design as shown in FIG. 9 and as discussed above. It should be noted there may be many modifications of the foregoing template design for the automatic application of silicone composition onto the patterned surface of the part 750. Design of the template as disclosed in FIG. 9 and as modified by methods well known in the art allows for the automatic and regulated uniform travel of the dispensing means about the set path in part 750 so as to apply a uniform bead of gasketing composition on the surface of the part 750.

Accordingly with the invention of the instant case, it is posssible to apply a uniformed bead of silicone composition to form a formed in place gasket on the part in which the only functions left for the operator to determine is the starting and stopping of the application or dispensing of the silicone composition and the rate at which the dispensing means moves over the determined path on the part. However, with an additional modification even the rate of dispensing of the silicone composition over the predetermined path of the part can be automated. Accordingly, with this invention the formation of formed in placed gaskets with silicone compositions and other compositions, is immensely simplified while standardized and done in a predetermined manner such that there is a minimum of rejection of parts. According to the invention of the instant case, it allows a fabricator to prepare formed in place gaskets for parts with silicone gasketing composition or other gasketing composition in a semi-automated manner with a minimum of investment.

I claim:

1. A hand operated machine for applying a gasketing coposition on a part comprising, a frame;

a base on said frame in which is placed said part on which said gasketing composition is applied;

template means corresponding to a said part and having track means therewith corresponding to said template;

a vertical support mounted on said frame;

a horizontally movable arm connected at one end to said support and a horizontally movable joint means pivotally mounted at the other end;

first forearm means extending from said joint means and pivotally mounted thereon for movement in a vertical plane;

second forearm means extending from said joint means and supporting roller means operatively associated with said track;

means for dispensing said composition mounted on said first forearm such that it travels in fixed relationship to said roller means;

trigger means for activating said dispensing means; and means for imparting motion to said assemblage of arms and joint means whereby movement of said roller means about said track is associated with movement of the dispenser in a path to effect application of the gasketing composition to said part.

2. The machine of claim 1 wherein said means for imparting motion includes handle means for controlling movement.

3. The machine of claim 2 wherein said frame means comprises a base platform on which there is mounted said base and said template means.

4. The machine of claim 3 wherein said trigger means comprises a four-way air valve and a trigger which is activated by mechanical pressure.

5. The machine of claim 4 wherein the dispensing means comprises an air activated valve means to which is connected the uncured gasketing composition under pessure.

6. The machine of claim 5 wherein the unused gasketing composition is supplied under pressure through flexible lines to said dispensing means.

7. The machine of claim 1 wherein said second forearm is disposed below said first forearm and parallel therewith.

8. The machine of claim 7 wherein said track means comprises a channel and said roller rides therein.

9. The machine of claim 8 wherein there is stop means on said horizontal joint to stop the downward travel of said first forearm.

10. The machine of claim 1 wherein said means for imparting motion comprises motor means operative to drive the roll means by frictional contact between the driven roll means and the track means.

11. The machine of claim 10 wherein said roller means comprise upper and lower rolls mounted on a single vertical shaft and said rolls respectively engage on opposed section of the track means disposed at the associated roll level.

12. The machine of claim 4 wherein said motor means is connected to said four-way air valve and activated by said trigger means.

* * * * *